United States Patent [19]
Herfeld

[11] 3,877,649
[45] Apr. 15, 1975

[54] APPARATUS FOR CONVERTING THERMOPLASTIC MATERIAL

[76] Inventor: Friedrich Walter Herfeld, Muhlendorf 11, 5982 Neurenrade, Germany

[22] Filed: Nov. 23, 1973

[21] Appl. No.: 418,355

[30] Foreign Application Priority Data
Nov. 28, 1972 Germany............................ 2258197

[52] U.S. Cl. ..................... 241/57; 241/65; 241/154
[51] Int. Cl. ............................................ B02c 21/00
[58] Field of Search .............. 241/3, 23, 29, 54, 60, 241/65, 154

[56] References Cited
UNITED STATES PATENTS

| | | | |
|---|---|---|---|
| 2,959,362 | 11/1960 | Smith et al.............................. | 241/3 |
| 3,510,067 | 5/1970 | Beck et al.......................... | 241/65 X |
| 3,605,836 | 9/1971 | Schnell ................................. | 241/65 |
| 3,785,577 | 1/1974 | Carlsmith et al. ..................... | 241/57 |

*Primary Examiner*—Granville Y. Custer, Jr.
*Attorney, Agent, or Firm*—Allison C. Collard

[57] ABSTRACT

The invention provides an apparatus and process for converting thermoplastic materials in the form of lumps, pieces, sheets, or plates into a free-flowing granulated form, in which the material is fed to a mixing receptacle and comminuted by a rapidly rotating comminuting device. The comminuted material is then heated solely by frictional heat generated within the material, agglomerated, condensed, and then cooled immediately after gelation. The comminution is effected without any perceptible evolution of heat by means of a cutting blade mounted on the axle of the comminuting device in the upper part of the mixing receptacle. The frictional heat is generated by mixing blades rotating in the lower portion of said receptacle. The granulated material is then removed from an outlet in the mixing receptacle.

7 Claims, 2 Drawing Figures

APPARATUS FOR CONVERTING THERMOPLASTIC MATERIAL

This invention relates to a process and apparatus for converting thermoplastic materials in the form of lumps, pieces, sheets or plates, into a free-flowing granulated form.

A specific sphere of application of the invention is the comminution and granulation of thermoplastic waste such as foils, sheets, or blow mouldings.

In the process disclosed in German specification No. 1,679,834, beater blades or knives are mounted on a driving shaft in the lower region of the mixing receptacle, the rotation of which is said both to comminute the material being mixed and also to heat it by frictional heat. The opposing fixed knives required for the comminuting action are oppositely mounted in the lower portion of the wall of the container. The driving shaft rotates with a high speed in order to achieve an adequate mixing, heating and condensing of the material. Nevertheless there is an excessive evolution of heat from the comminuting action, which can easily give rise to overheating. The considerable evolution of heat at the oppositely disposed knives and the material leads to non-uniform condensation and an undesirable shortening of the duration of the process. Moreover, the comminution requires a very high torque from the driving shaft because of the considerable radial extension of the beater blades.

The invention provides a process for converting thermoplastic materials in the form of lumps, pieces, sheets, or plates into a free-flowing granulated form, in which the material is fed to a mixing receptacle and comminuted by a rapidly rotating comminuting device. The comminuted material is then heated solely by frictional heat generated within the material, agglomerated, condensed, and then cooled immediately after gelation. The comminution is effected without any perceptible evolution of heat by means of a cutting blade mounted on the axle of the comminuting device in the upper part of the mixing receptacle. The frictional heat is generated by mixing blades rotating in the lower portion of said receptacle.

The invention further provides an apparatus for performing the above described process which includes comminuting blades on a driving shaft passing through the floor of a vertical mixing receptacle. The driving shaft extends upwardly towards the head section of the mixing receptacle into an approximately cylindrical comminution chamber and includes cutting blades mounted on a holder. The driving shaft is equipped with mixing blades at least within the lowermost portion of the mixing receptacle.

The comminution in the upper part of the mixing receptacle can be carried out to produce comminuted particles of uniform grain size. Carrying out the comminution separately ensures that no uncomminuted material remains after this operation. The frictional heat generated during the mixing operation can be accurately adjusted in accordance with the required gelling temperature. This mode of operation enables the cutting blades to be kept comparatively short in comparison with the mixing blades, in order to prevent any prohibitively large cutting torque from reacting on the driving shaft. The driving torque may thus be adjusted in accordance with the required degree of heating and mixed material. The mixing blades rotate at the customary speed for centrifugal mixers. Since the beater or cutter blades are shorter, their peripheral speed is correspondingly lower, so that the frictional heat generated during comminution is reduced to a corresponding degree.

Provision is made in accordance with the invention for mounting a plate on the driving shaft defining with the cylindrical wall of the comminution chamber an annular gap, the beater knives or blades being mounted above said plate. This ensures that only those particles fall into the mixing receptacle that are small enough to pass through the annular gap.

The beater knives or blades are mounted approximately radially above the plate and are spaced apart at a distance corresponding to the blade width. They cooperate with oppositely disposed blades fixed to the cylindrical wall of the comminution chamber to achieve a very effective communition action.

In order to have uniform thorough mixing and condensation of the material while keeping the grain size constant, one or more shafts equipped with comminuting blades are tilted downwardly towards the base of the mixing receptacle and mounted so as to pass through the side walls of said receptacle. These blades rotate in the same direction as the mixing blades, but at a higher speed. By this means, it is possible to provide uniform grain size of the granulated material and prevent the formation of agglomerated accretions.

Finally, an air blower is provided to blow in cool air at the termination of the mixing process. The filler neck has an automatically self-closing sealing cap operated by positive pressure within the mixing receptacle.

An embodiment of the invention will be described with reference to the accompanying drawings wherein similar reference characters denote similar elements throughout the several views.

Figure 1:
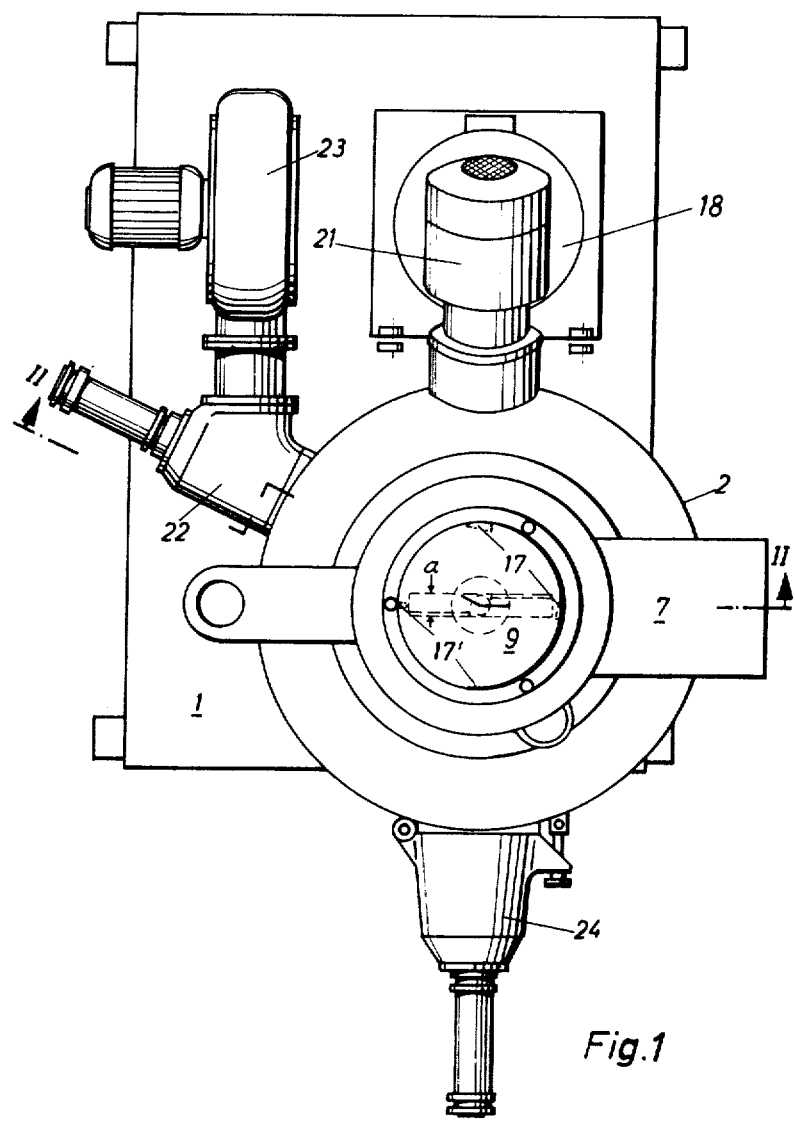
FIG. 1 is a plan view of the apparatus.
Figure 2:
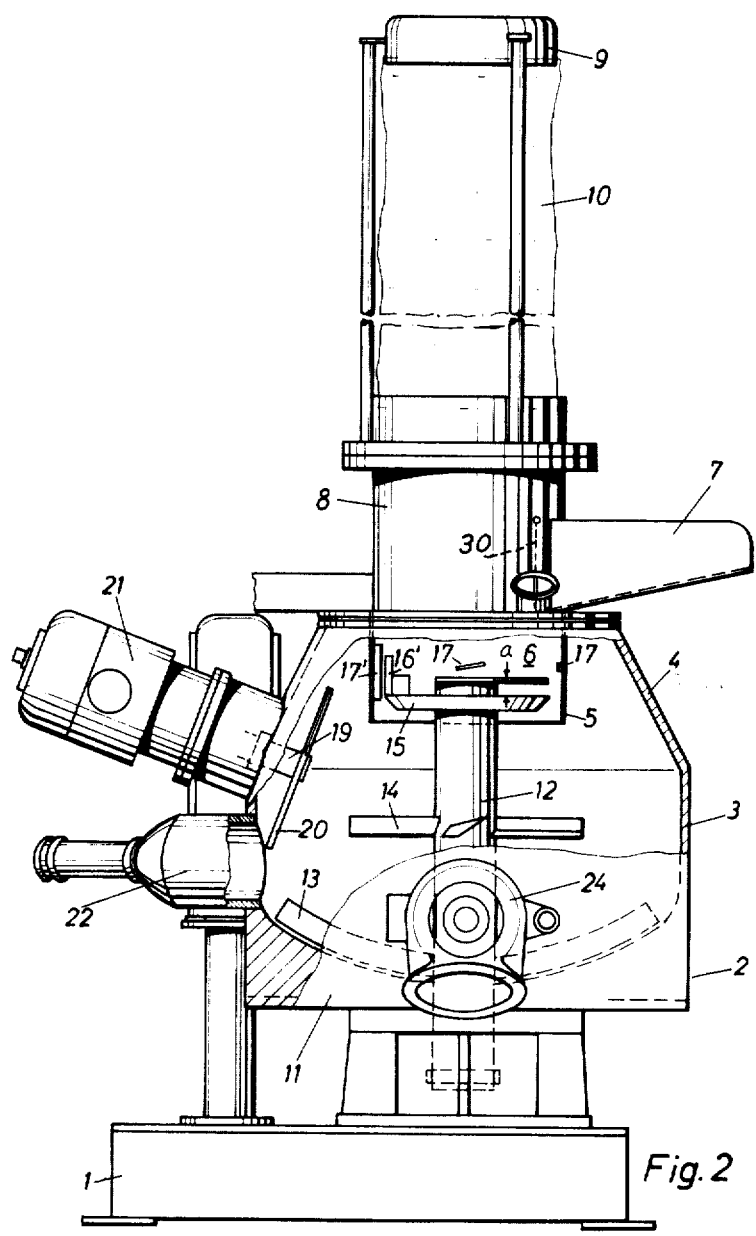
FIG. 2 is a partial sectional elevation along the line II-II of FIG. 1.

Referring to FIGS. 1 and 2, a mixing receptacle 2 is erected vertically upon a foundation frame or plate 1. A side wall 3 of said receptacle is either vertical or inclined slightly inwardly. The receptacle terminates at its top in a frusto-conical head section 4. Section 4 accommodates an approximately cylindrical wall 5 of a comminution chamber 6, the diameter of which is about half that of mixing receptacle 2. Above the head section is positioned a charging neck 7 provided with a lid 30, which is adapted to be closed automatically when there is a positive pressure in the mixing receptacle. A supporting frame 9 for a dust bag 10 is mounted on a head attachment 8. The bag is held in position by the pressure of an air draft which transports dust particles out through air apertures in the head section.

A drive shaft 12 passing through the floor 11 of mixing receptacle 2, has mixing vanes 13 mounted on its lowest end. Additional mixing vanes 14 are mounted on the central section, and a plate or disc 15 with comminution blades 16 are mounted on the shaft within comminution chamber 6. Between plate or disc 15 and cylindrical wall 5 of comminution chamber 6 is an annular gap, the width of which corresponds approximately to the desired grain size of the granulated material. Comminuting blades 16 are designed as radially mounted beater blades, which are spaced apart at intervals $a$ corresponding approximately to the width $a$ of the blade above plate or disc 15. According to a modified form, the comminuting blades 16' can be arranged approximately parallel to the disc axis on the periphery of the disc. A plurality of stationary blades 17 or 17' which cooperate with comminuting blades 16, are mounted on cylinder wall 5 opposite said comminuting blades. These fixed blades may be tilted downwardly in the direction of rotation of the comminuting blades as shown at 17, or they may be mounted vertically as shown at 17'. Drive shaft 12 is driven by a motor 18.

The comminuting apparatus is also equipped with a comminuting shaft 19 which extends in a downwardly inclined direction through the side wall of mixing receptacle 2. Comminuting shaft 19, which is driven by a motor 21, carries comminuting blades 20 and rotates in the same direction as driving shaft 12. The peripheral speed of comminuting blades 20 is, however, greater than the peripheral speed of mixing blades 13. This means that comminuting blades 20 move at a substantially greater speed than the material being circulated in the mixing receptacle so as to bring about uniform comminution of the material.

In FIG. 2, the comminution device is shown intersected by the partical cross-sectional plane. Several of these comminution devices may also be mounted around the periphery of the mixing receptacle.

Finally, the mixing receptacle is provided with an air inlet device 22 connected to a blower 23, and an outlet gate valve 24 for discharging the product.

The thermoplastic waste which is to be comminuted and compressed is fed in through charging neck 7. The material comes into contact with comminuting blades 16 within comminuting chamber 6, is comminuted and is thereupon intimately admixed in the mixing receptacle 2. The resulting heating leads to gelation so that condensation and granulation ensue. Comminuting blades 20 prevent the agglomerated material from forming accretions and ensure that the granulated material is of a uniform grain size. The separate arrangement of comminuting blades 16 and mixing blades 13 enables the torque of the shaft to be suitably distributed and applied. The leverage exerted by drive shaft 12 in the course of the beating action for comminution is relatively small, so that the torque required for comminution is of about the same magnitude as that required for the thorough mixing of the material. The torque required for such mixing does not therefore exceed the optimum value which ensures an adequate duration of mixing. As soon as the desired mixing temperature, necessary for the granulation and gelation of the material is reached, air blower 22 is switched on and cool air is blown into the receptacle. The material is thus gradually cooled down, the cooling being effected by the operation of comminuting blades 20. The air blast generates a positive pressure within the mixing receptacle which causes the lid of charging neck 7 to close automatically, so that no further material can be charged in during the cooling period. The cool air passing through attachment 8 is cleaned in dust bag 10. When it has cooled down sufficiently, the product is discharged through outlet gate valve 24.

While only a single embodiment of the invention is shown and described it is to be understood that many changes and moficiations may be made thereunto without departing from the spirit and scope of the invention.

I claim:

1. An apparatus for converting thermoplastic material in the form of lumps, pieces, plates, and sheets into free flowing granulated form comprising:
   a substantially cylindrical mixing receptacle having a floor portion and a top portion;
   a shaft pivotably disposed through the axis of the mixing receptacle having mixing blades for movement along the floor of said receptacle;
   a substantially cylindrical comminuting chamber centrally disposed in the top portion of said mixing receptacle and receiving said shaft;
   comminuting blades mounted on said shaft for movement within said comminuting chamber;
   a charging input communicative with said comminuting chamber for receiving the thermoplastic material to be converted; and
   a discharge outlet mounted adjacent to the floor of the mixing receptacle for discharging the material after mixing and granulation.

2. The apparatus as recited in claim 1 wherein said shaft additionally comprises a circular plate mounted within said comminuting chamber adjacent to said comminuting blades, said plate and the cylindrical walls of said comminuting chamber defining an annular gap corresponding to the desired grain size of the granulated material.

3. The apparatus as recited in claim 2 wherein said comminuting blades are spaced from said plate in an axial direction by a distance corresponding to the width of one blade.

4. The apparatus as recited in claim 2 additionally comprising fixed blades secured to the wall of said comminuting chamber adjacent to said comminuting blades.

5. The apparatus according to claim 1 wherein the diameter of said comminuting chamber is smaller than the diameter of said mixing receptacle.

6. The apparatus according to claim 1 comprising at least one additional comminuting shaft having comminuting blades, inserted in a downwardly tilted direction through the wall of said mixing receptacle, said at least one shaft rotating in the same direction as the shaft of said mixing blades but at a higher peripheral speed.

7. The apparatus as recited in claim 1 additionally comprising an air blowing device coupled to said mixing receptacle for blowing cool air therein, and said charging input additionally comprises a sealing lid adapted to close automatically by the action of the air pressure in said mixing receptacle.

* * * * *